United States Patent
Dreese et al.

(10) Patent No.: US 7,258,888 B2
(45) Date of Patent: Aug. 21, 2007

(54) FLOUR AND DOUGH COMPOSITIONS AND RELATED METHODS

(75) Inventors: Patrick C. Dreese, Plymouth, MN (US); David H. Katzke, Shoreview, MN (US); Barbara E. Vincent, North Branch, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 0 days.

(21) Appl. No.: 11/108,514

(22) Filed: Apr. 18, 2005

(65) Prior Publication Data

US 2005/0255219 A1   Nov. 17, 2005

Related U.S. Application Data

(60) Provisional application No. 60/569,992, filed on May 11, 2004.

(51) Int. Cl.
*A23L 1/10*   (2006.01)
(52) U.S. Cl. .............. 426/615; 426/511; 426/549; 426/551; 426/622
(58) Field of Classification Search ............ 426/549, 426/615, 551, 622, 511
See application file for complete search history.

(56) References Cited

U.S. PATENT DOCUMENTS

| | | | |
|---|---|---|---|
| 3,857,987 A | 12/1974 | Rogols et al. | |
| 5,114,079 A | 5/1992 | Curran | |
| 5,164,013 A | 11/1992 | Posner et al. | |
| 5,240,733 A | 8/1993 | Tkac | |
| 5,395,639 A | 3/1995 | Chawan et al. | |
| 5,523,109 A | 6/1996 | Hellweg et al. | |
| 5,908,940 A * | 6/1999 | Lane et al. .................. | 549/413 |
| 6,610,349 B1 * | 8/2003 | Delrue et al. ................ | 426/622 |
| 6,899,907 B1 * | 5/2005 | Monsalve-Gonzalez et al. . | 426/253 |
| 2003/0104103 A1 | 6/2003 | Monsalve-Gonzalez et al. | |
| 2003/0108652 A1 | 6/2003 | Monsalve-Gonzalez et al. | |

* cited by examiner

*Primary Examiner*—Helen Pratt
(74) *Attorney, Agent, or Firm*—Douglas J. Taylor; Arlene L. Hornilla; John A. O'Toole

(57) ABSTRACT

Described are methods of treating wheat grain, including reducing the amount of active enzymes in a milled wheat grain by treating a portion of the wheat grain that includes one or more of wheat bran or wheat germ to deactivate enzymes; as well as flour and dough compositions prepared from the treated portion of wheat grain.

15 Claims, 1 Drawing Sheet

FLOUR AND DOUGH COMPOSITIONS AND RELATED METHODS

REFERENCE TO RELATED APPLICATIONS

This application claims the benefit of priority under 35 U.S.C. 119(e)(1) of a provisional patent application, Ser. No. 60/569,992, filed May 11, 2004, which is incorporated herein by reference in its entirety.

FIELD OF THE INVENTION

The invention relates to methods of processing wheat, to wheat flour compositions for use in food products such as doughs, and to related methods involving preparation and use of the wheat flour and food compositions, wherein preparation of the flour includes treatment of wheat constituents to deactivate enzymes.

BACKGROUND OF THE INVENTION

Refrigerated dough products are popular with consumer and commercial users due to their ease of use and ability to maintain freshness during extended periods of refrigerated storage, e.g., up to several weeks or months. It is a continuing goal in the dough and bread making arts to improve storage stability of refrigerated dough products.

For some types of dough products and dough product ingredients, storage stability can be more difficult than for others. An example of a class of dough product that can be particularly difficult to store is the class of whole-wheat doughs. At the same time, whole-wheat dough products are often specifically desired by consumers for their healthful attributes, such as a high dietary fiber content and the presence of vitamins and minerals not present in doughs prepared without whole-wheat flour (i.e., doughs prepared with processed white flour). A whole-wheat dough product that has extended refrigerated storage stability would be quite desirable to consumers.

The difficulty in storing whole-wheat doughs, as well as whole-wheat flours and other whole-wheat food products, is due to enzymes that are naturally present in a wheat grain and that can cause spoilage. These enzymes are more prevalent in wheat germ and bran, which are used to make whole wheat flour but not white flour. Thus, processes for making non-whole wheat flours, e.g., processed "white" flours, generally remove a large percentage of these enzymes. Processes for preparing whole-wheat flours, on the other hand, retain the germ and bran, resulting in whole-wheat flour compositions having relatively high concentrations of enzymes. These enzymes become part of a finished whole-wheat flour, or a dough or other food product made from a whole-wheat flour, where the enzymes can cause a relatively rapid loss of freshness, at least compared to similar products made using a non-whole-wheat flour that contains fewer active enzymes. In the particular instance of refrigerated dough products, producing a refrigerator-stable whole-wheat dough product has been a difficult challenge for dough product producers.

Because consumers specifically desire whole-wheat food products, for example a refrigerator-stable whole-wheat dough product, it is desirable to produce whole-wheat flours and food products. Especially desirable are whole-wheat flour, dough, and other food products, that retain desired freshness for extended periods of storage, e.g., refrigerated storage.

SUMMARY OF THE INVENTION

Wheat grains include active enzymes that can produce spoilage in food products prepared from the wheat grain, such as a flour or a dough or other food product. The enzymes are contained throughout the wheat grain, or "kernel," which includes three major portions referred to as the germ, the bran, and the endosperm. Enzymes are significantly more concentrated in the wheat germ and wheat bran portions of a kernel, and are less concentrated in the much larger endosperm, to the extent that most of the enzymes in a wheat kernel are in the germ and bran, even though the germ and bran make up only a minority of the total wheat kernel.

Some wheat flours (e.g., non-whole wheat flours) are prepared from mostly endosperm and only very minor amounts of bran and germ. These formulations remove a large portion of the active enzymes of a wheat grain by removing the bran and germ, and preparing the flour from substantially only the endosperm. Whole-wheat flours, on the other hand, include the bran and the germ, and therefore include much higher concentrations of the enzymes that can cause spoilage.

The invention involves methods of deactivating enzymes from milled wheat grain. Certain embodiments of the invention involve deactivating enzymes contained in wheat bran and wheat germ, to prepare a wheat flour, e.g., a whole-wheat flour. Deactivating enzymes in the bran and germ can allow the production of flour that has improved storage stability compared to flours of similar composition with non-deactivated enzymes. Likewise, the flour can be used to produce food products with reduced active-enzyme content and improved stability and shelf life.

According to certain specific embodiments, the invention can involve the processing of milled wheat grain constituents including portions that contain endosperm, wheat bran, and wheat germ, to prepare a flour having a reduced amount of active enzymes. As an example, milled wheat grain can be separated into a portion that includes mostly endosperm and a portion that includes mostly bran and germ. The portion that contains mostly bran and germ can be processed separately from the endosperm portion, by a heat treatment method that reduces the amount of active enzymes in the bran and germ portion. Heat treatment can be done by exposure to heat, in the form of steam. The wheat grain constituents—the endosperm and the heat-treated bran and germ—can be combined to prepare a flour that contains reduced enzymes, such as a whole-wheat flour that contains constituents in amounts similar to amounts found in natural wheat grain. The flour can exhibit improved storage stability, as can dough products prepared from the flour.

An exemplary method of the invention relates to preparation of a low enzyme flour such as a low enzyme whole wheat flour. The exemplary method can include heat-treating a majority of, e.g., substantially all of, the wheat bran and wheat germ of a milled wheat grain to deactivate enzymes in the bran and germ. The endosperm, containing lower concentrations of enzymes, does not need to be treated to remove enzymes and may avoid heat treatment that would damage other desired materials of the endosperm such as proteins or starches. The treated bran and germ can be combined with the non-treated endosperm to produce a desired flour.

According to the present description, the term "whole-wheat," as it refers to whole-wheat flour, refers generally to compositions derived from wheat grain, wherein constituents of wheat grain are used in approximately the same amounts as occur naturally. Such flours and compositions may be labeled and sold as a "whole-wheat" type of product. An example of a whole-wheat flour is a flour as defined in United States Code Title 21, Chapter I, Part 137, Subpart B, Section 137.200—Whole wheat flour—which states, in part, that "whole-wheat flour" is prepared by grinding cleaned wheat, wherein "the proportions of natural constituents of such wheat, other than moisture, remain unaltered." (With regard to moisture, the definition as used herein includes flours wherein the amount of water remains unaltered as well as flours wherein the amount of water does not remain unaltered.) Another example of a whole-wheat flour is a flour according to the Health Canada definition of whole-wheat, at B. 13.005[S], which states in part that Whole wheat flour or Entire wheat flour shall be prepared by grinding and bolting cleaned, milling grades of wheat from which a part of the outer bran or epidermis layer may have been separated, and shall contain the natural constituents of the wheat berry to the extent of not less than 95 percent of the total weight of the wheat from which it is milled.

The term "whole-wheat," as it refers to food compositions, refers generally to food compositions that contain a whole-wheat flour as an ingredient.

An aspect of the invention relates to a method of processing wheat. The method includes providing milled wheat grain constituents including a flour portion comprising endosperm, and a bran portion comprising wheat bran and wheat germ; heat treating at least a portion of the bran portion to deactivate enzymes; and combining the flour and bran portions to produce flour.

In another aspect, the invention relates to a low enzyme whole-wheat flour. The whole wheat flour contains substantially the same proportions of natural constituents as a wheat kernel, other than moisture, and less than 4000 units active peroxidase per gram.

In another aspect, the invention relates to a dough composition that includes a low enzyme whole-wheat flour. The flour includes substantially the same proportions of natural constituents as a wheat grain, other than moisture, and less than 4000 units per gram active peroxidase.

DETAILED DESCRIPTION

Figure 1:
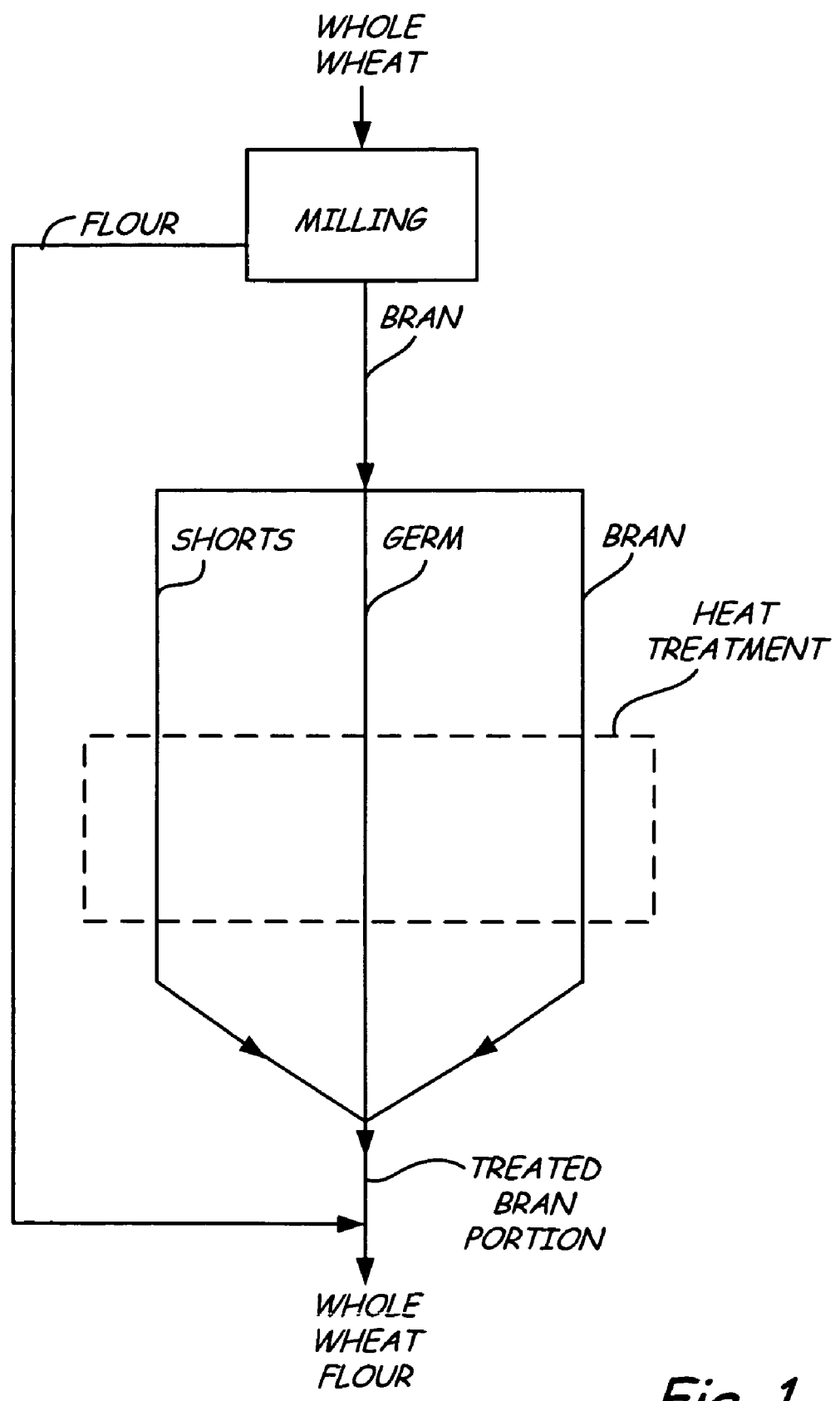
FIG. 1 is a flow-diagram that illustrates an exemplary process according to the invention.

The invention involves deactivation of enzymes found in wheat grain. Any type of wheat grain, or combinations of one or more wheat grain, can be used, as desired, including high or low protein content wheat grains. The particular grain or combination of grains can be selected based on a variety of factors, e.g., relating to the desired product to be produced, economics, availability, etc. Non-limiting examples of types of wheat grains include Common Wheat, (*Triticum vulgare*), Durum Wheat (*T. durum*) and Club Wheat (*T. Compactum*).

A wheat grain (or "berry" or "kernel") generally includes an outer bran layer, an inner endosperm, and an inner germ, all of which contain various amounts and concentrations of enzymes, including peroxidase, xylanase, protease, amylase, polyphenyl oxidase, phosphatase, lipase, and liposygenase.

A majority of the grain is the starchy endosperm, typically accounting for up about 82 to 83 weight percent of the wheat grain. Endosperm is a major constituent of a wheat flour. The endosperm contains relatively lower amounts of enzymes than do the wheat bran and wheat germ.

Approximately 2 to 3 (e.g., 2.5) weight percent of wheat grain can normally be wheat germ, which is known to be the germinating section of a wheat grain. To produce many non-whole-wheat products (e.g., processed white flour), the wheat germ is often removed from the rest of the wheat grain. The wheat germ contains relatively higher concentrations of enzymes than does the endosperm.

An outer layer of a wheat grain is a wheat bran or seed coat layer. Typically, the wheat bran makes up approximately 14 to 15 weight percent of a wheat grain. The wheat bran is also separated from the rest of the wheat grain when preparing many non-whole-wheat products. The wheat bran also contains relatively higher concentrations of enzymes than does the endosperm.

Wheat grain can have a moisture content over a large range depending on the stage of processing, atmosphere, etc. In general, moisture content of harvested wheat grain is below about 16 percent. Stored wheat grain may have a moisture content of below 15, e.g., in the range from about 10 to about 12 percent. At dry conditions, wheat grain may have a moisture content below this range, e.g., from 6 to 8 percent. If tempered prior to milling, wheat grain may have a moisture content of approximately 14 to 16 percent.

While many different enzymes are present in wheat grain, enzyme levels of wheat grain and wheat grain constituents are often measured in terms of the enzyme peroxidase. Peroxidase is only one of many enzymes typically present in a wheat grain, and it may not be the most important enzyme with respect to retained freshness of a flour or a dough product. Peroxidase, however, may be reliably measured by standard analytical techniques, including the method provided in the Examples section of the present description. Also, peroxidase is relatively robust compared to some other enzymes present in a wheat grain, meaning that peroxidase can be relatively more heat-stable and difficult to deactivate compared to such other, less robust enzyme species. As such, when measuring deactivation of enzymes of wheat grain constituents, e.g., according to methods of the invention, an indication of peroxidase deactivation can also be an indication that other less heat-stable enzymes have also been deactivated.

As an example, average amounts of peroxidase that may be found in a wheat grain can be in the range from 4000 to 6000 units peroxidase per gram wheat grain, e.g., from 4600 to 4800 units per gram, often about 4800 units of peroxidase per gram of a total wheat grain. These amounts are given as exemplary averages and keeping in mind that in a biological system such as wheat grain, deviations from the norm can occur. Of a total amount of peroxidase (and enzymes generally), different portions of a wheat grain will contain different concentrations and different total amounts of peroxidase (and enzymes generally), with relatively lower concentrations being present in the endosperm and higher concentrations and being presenting wheat germ and wheat bran.

According to the invention, milled wheat grain constituents including bran, germ, and endosperm are provided, separately or in a wheat or partial wheat grain form. In specific embodiments, wheat grain constituents can be provided in relative amounts that are close to or the same as found to occur naturally in wheat grain, e.g., each constituent being within 95 percent of its natural amount in a wheat grain. This can mean that endosperm, wheat germ, and wheat bran constituents can be provided in amounts that are between 95 and 100 percent of the respective amounts of in which these materials are found naturally in whole wheat grain. The whole wheat grain may be a single type of grain or a combination of two or more different types of grains. The wheat constituents can be provided from any source, such as separate milling processes of the same or different types of wheat grains, but often for convenience can be provided from a single milling process. A single milling process may include more than a single type of wheat grain, if desired. Thus, the invention, and the above exemplary percentages, can be applied to a combination of wheat grains.

Processes for milling wheat grain that will be useful according to the invention are commonly known and practiced. According to exemplary such methods, mill quality wheat grain can be processed by milling steps that may include one or more of bran removal such as pearling, pearling to remove germ, other forms of abrading, grinding, sizing, tempering, etc.

Normally when wheat grain is milled, the milled wheat grain can be considered to be made up of two general portions that will be referred to herein as a "flour" portion and a "bran" portion. The relative amounts of these "portions," and the various types and amounts of constituents of each portion, can depend on factors such as the milling process and the desired product (e.g., flour). Overall, the total amount of the various constituents of a milled wheat grain (including endosperm, wheat bran, and wheat germ) will be substantially similar to the natural amounts of those constituents in the wheat grain prior to milling. The amounts of the wheat grain constituents, however, may be divided between the "flour" portion and the "bran" portion based on the milling process, intended use of a milled wheat grain, or any other basis of preference.

Often, wheat grain is milled to produce a flour portion that is substantially endosperm and a bran portion that contains substantially the balance of the wheat grain components, which will include a substantial majority of wheat germ and wheat bran. The amount of flour portion based on total milled wheat grain may often be an amount in the range from about 65 to about 85 weight percent flour portion, e.g., from about 70 to about 80 weight percent flour portion. The flour portion is the portion of flour normally used in preparing non-whole-wheat flour, e.g., processed white flour. The flour portion can be made up of almost entirely endosperm, e.g., greater than 99 weight percent endosperm based on the total weight of the flour portion, and can also normally contain relatively low amounts of wheat bran and wheat germ, e.g., typically less than 1 or 2 weight percent based on the total weight of the flour portion. The moisture content of the flour portion is normally in the range from 10 to 20 percent. A flour portion of a milled wheat grain will include peroxidase enzyme in a concentration that is similar to the concentration of peroxidase enzyme in the endosperm of the wheat grain. This can result in a flour portion that includes peroxidase enzyme in an amount from between 500 to 700 units active peroxidase per gram (of the flour portion), e.g., about 600 units active peroxidase per gram of flour portion. Again, these amounts are given as exemplary averages and keeping in mind that in a biological system such as wheat grain, deviations from the norm can occur.

According to terminology used herein, milled wheat grain also produces a bran portion that contains the constituents of the milled wheat grain that are not included in the flour portion. The bran portion contains mostly wheat bran and wheat germ, but normally will also contain some small amount of endosperm (normally less than 30 percent endosperm, e.g., less than 20 or 10 percent endosperm, by weight, based on the total amount of bran portion.)

The bran portion also contains enzymes, including peroxidase. The concentrations of enzymes in the majority constituents of a bran portion (wheat germ and the wheat germ) are relatively high compared to the concentrations of enzymes in the majority constituent of the flour portion (endosperm). Thus, the concentrations of enzymes (e.g., peroxidase) in a bran portion of milled wheat grain will normally be higher than the concentrations of enzymes in the flour portion. For example, in terms of the enzyme peroxidase, a bran portion may contain up to 30,000 units active peroxidase per gram (on a dry basis).

A bran portion of milled wheat grain may be handled or processed as a single material or material stream, or may be separated into different sub-portions of a milled flour that can be processed separately and differently. Whether a bran portion is separated, and if so into what sub-portions, can be based on factors such as utility, convenience, economic considerations, or any other bases of preference. A bran portion may be separated into any variety of useful sub-portions that may include portions sometimes referred to as "midds" or "shorts," "germ," and "bran." Alternate sub-portions may be referred to as fine bran and coarse bran.

According to the invention, at least some of a total amount of bran portion is treated to deactivate enzymes contained therein. The amount of enzyme contained in a bran portion is relatively high, due to the high concentrations of enzymes contained in wheat germ and wheat bran. These enzymes, if they are not removed and make their way into a flour product or a food product (e.g., dough product) prepared from the flour, can remain active and lead to spoilage.

The treatment to deactivate enzymes can include any form of treatment that can result in reduction in the overall content of active enzyme of a bran portion. The treatment can be performed on the entire bran portion or any sub-portion. According to certain embodiments of the invention, a substantial amount of a bran portion, or even the entire bran portion, can be treated to deactivate enzymes. Other embodiments can include treating any one or more sub-portion of a bran portion, such as treating one or more of a bran sub-portion, a germ sub-portion, or a shorts sub-portion; or, alternatively treating any one or more of a coarse bran sub-portion or a fine bran sub-portion; as these are discussed above; or combinations of these or other sub-portions. According to certain embodiments of the invention, wherein a large amount of the total amount of active enzymes in a bran portion are desired to be deactivated, most or all of the bran portion can be treated.

A bran portion or sub-portion can be treated to reduce the amount of active enzyme in the overall bran portion of a milled wheat grain. The extent of deactivation can be as desired. In particular embodiments of the invention, the extent of enzyme deactivation can be at least sufficient to improve storage stability of a flour, food ingredient, or other food product prepared from the treated bran portion or sub-portion.

Methods of deactivating enzymes in food products and food ingredients are generally known and are being continuously developed and improved. The skilled artisan, with an understanding of such methods, and based additionally on the present description, will appreciate how methods for deactivating enzymes can be useful to deactivate enzymes contained in a bran material such as a bran portion or a sub-portion as described. Presently useful methods can involve the use of heat treatment, including heat treatment by contact with steam, which can involve exposing a bran portion or sub-portion to conditions of heat or steam for a desired amount of time, at a useful temperature, optionally while the bran material includes a desired or effective amount of moisture. Steam, if used, can be standard steam at a desired pressure, or superheated steam, as desired. The combination of temperature, timing, agitation, and internal and external moisture, as well as other factors of a useful process, can be effective to deactivate amounts of enzymes contained in a bran material.

In exemplary embodiments, an entire bran portion of a milled wheat grain, or substantially the entire bran portion (e.g., at least 90 or 95 percent), can be heat treated using steam to deactivate enzymes in the bran portion. Alternately, any one or more of sub-portions of a bran portion may be separately heat treated using steam to deactivate enzymes, if desired. If sub-portions are separated and processed, the separate sub-portions may be re-combined after processing to produce a re-combined, treated bran portion that contains a substantially-reduced amount of active enzymes.

Methods of denaturing a bran portion or sub-portion can result in deactivating a good portion of enzymes contained in the bran, such as at least 30 percent of the original active enzymes. In certain embodiments, a majority of the total amount of enzymes contained in a total bran portion can be deactivated, e.g., at least 50 percent, 80, 90, or 95 percent, of the total enzyme contained in the entire bran portion. In terms of peroxidase content of a total bran portion, amounts consistent with the above percentages are useful, while certain methods of the invention that include treating the entire bran portion of wheat grain can produce a bran portion that contains less than 5,000 units of active peroxidase per gram, e.g., less than 1,000 units active peroxidase per gram, or even less than 500 units of active peroxidase per gram bran portion (on a dry basis). Other enzymes contained in the bran portion may normally also be substantially deactivated.

For exemplary denaturing conditions, useful temperatures for deactivating enzymes may be close to, equal to, or greater than a temperature of non-pressurized or pressurized steam, e.g., from 175 to 350 or 400 degrees Fahrenheit. The time of exposure of a material to such a temperature can be any effective amount of time, such as a matter of seconds or minutes, up to an hour if needed or desired. The amount of time may depend greatly on the nature of equipment and processing steps used. For batch systems that do not include much agitation, a time in the range of minutes to an hour may be required. For automated, high speed or high volume processes, residence times of wheat grain can be substantially less than an hour, e.g., a matter of minutes, seconds, or less than a second.

A process of inactivating enzymes may optionally include agitation of the material being treated. If desired or necessary, such as with batch processes, a process for deactivating enzymes can be performed in stages, e.g., at different temperatures or different pressures. For example, a first stage performed with steam at atmospheric pressure, 212 F, for a time in the range from a matter of seconds (e.g., less than one second), or up to 30 seconds or a minute or a few minutes (e.g., 5 minutes), or up to 30 minutes, may be followed by a second stage at a different pressure, e.g., up to 45 minutes of pressurized steam at 250 F to 400 F.

Consistent with the exemplary temperature ranges and amounts of time described herein, the amount of heat energy to which a material is exposed for enzyme deactivation, according to the invention, can be an amount of heat energy that is sufficient to deactivate a useful or desired amount of enzymes. According to embodiments wherein the material is exposed to steam, the temperature of the steam and the amount of steam (relative to the amount of material being treated) can be selected and controlled to provide a desired amount of energy to deactivate enzyme. A useful amount of steam, e.g., by weight or volume, per weight or volume of a material being treated, can be an amount of steam that, for a given temperature and period of exposure, can deactivate a useful or desired amount of enzymes. A useful amount of steam can depend on factors such as the type of material being treated; the temperature of the steam; the amount of enzyme initially contained in the material being treated; the moisture content of the material being treated; the size of material particles; etc. A general exemplary range of useful amounts of steam (at 1 atmosphere, 212 F), for exposure times in the range from a fraction of a second to an hour, can be amounts in the range from 0.05 to 0.5 pound of steam per pound of material being treated (e.g., bran portion of a milled wheat material), e.g., from 0.05 to 0.2 pounds steam per pound of wheat material.

Enzymes in general can exhibit an increased susceptibility to being deactivated by heat, when the enzyme is in the presence of moisture. The amount of moisture can mean not only an amount of moisture in a processing atmosphere (e.g., due to humidity or the use of steam), but also an amount of moisture present in a wheat grain or a portion or constituent of a wheat grain during processing. In general, a relatively higher moisture content of wheat grain portion or wheat grain constituent or sub-portion, etc., can produce a relatively greater deactivating effect on enzymes. As such, conditions of temperature and time used to treat a material having a low moisture content (e.g., a bran portion having 5 weight percent moisture), normally result in deactivation of a lower percentage of enzymes compared to an identical process performed on a wheat material that is otherwise the same but has a higher moisture content (e.g., a bran portion having 16 weight percent moisture). For this reason, certain embodiments of the present invention include processing a wheat material, e.g., bran portion of wheat or a sub-portion thereof, while the material has a relatively high moisture content, such as a moisture content in the range from 10 to 16 weight percent.

According to various embodiments of the invention involving processing a bran portion of a milled wheat grain to deactivate enzymes, a flour portion of milled wheat grain may optionally be treated as desired, including a step to denature enzymes. According to certain specific embodiments of the invention, however, a flour portion does not need to be exposed to conditions that would inactivate enzymes, and is not exposed to such conditions.

A flour portion of milled wheat grain contains a substantial amount of endosperm, which includes high amounts of materials that have desired nutritional value, including proteins (e.g., gluten), starches, etc. For many flour and dough products, these proteins and starches should not be damage, e.g., denatured or otherwise inactivated, because such proteins and starches, etc., may be desired components of a wheat flour or wheat flour product. Because materials such as proteins and starches may be damaged if a flour portion is exposed to conditions that would inactivate enzymes contained in the flour portion, certain specific methods of the invention do not expose a flour portion to conditions that would deactivate enzymes. This feature of the invention—the ability to avoid steps of inactivating enzymes within a flour portion, which would also damage other useful materials of the flour portion—can be advantageous compared to certain other processes of preparing wheat flours that involve steps of processing to inactivate enzymes contained in endosperm. Steps of inactivating enzymes of endosperm (e.g., a flour portion) are normally performed under careful conditions that will prevent or reduce damage to materials such as protein (e.g., gluten) or starch. These steps can involve added cost and expense that can be avoided according to the invention.

Still additionally, steps of deactivating enzymes in a bran portion can be less complicated than methods of deactivating enzymes of endosperm (e.g., found in a flour portion). Wheat germ and wheat bran do not include substantial amounts of gluten-forming proteins. As such, treating a bran portion to inactivate enzymes does not involve an undue risk of protein denaturization or gluten deactivation. Thus, conditions for processing a bran portion to deactivate enzymes can be more stringent and less carefully controlled than conditions that would be used to treat a flour portion to deactivate enzymes, and such a process applied to the bran portion can require less control and less overall complication, and therefore less expensive, compared to a process applied to a flour portion.

According to the invention, a bran portion that has been treated to inactivate enzymes, as discussed, can be used as desired in a food product or food ingredient. An example of a food ingredient prepared according to the invention can be a whole-wheat flour prepared by treating at least some of the bran portion and re-combining the entire bran portion with a flour portion. An example of a food product prepared from such a whole-wheat flour can be a whole-wheat dough product, e.g., a refrigerated whole-wheat dough product. With at least some of the enzyme being deactivated, these flours and dough products exhibit improved stability compared to similar products prepared from whole-wheat flour that has not been treated as presently described. Exemplary amounts of deactivation of enzyme can be at least 30 percent of the total enzyme contained in the bran portion of the milled wheat grain, e.g., at least 80 percent, or even 90 or 95 percent of the total enzyme of the bran portion of the milled wheat grain.

As an example, a bran portion, following treatment to deactivate enzymes as described, can be combined with a flour portion (e.g., the flour portion of the same milled wheat grain that produced the bran portion) to produce a flour, e.g., a whole wheat flour. (If only a sub-portion of the bran portion of a milled wheat grain has been processed to deactivate enzymes, all of the sub-portions, following treatment to deactivate enzymes, can be combined with a flour portion.) The resultant flour can have substantially the same constituents as natural constituents of wheat grain (e.g., the original milled wheat grain), other than water, with the understanding that a substantial portion of enzymes have been deactivated. For example, in terms of the endosperm, bran, and germ constituents, a flour prepared by combining treated bran portion with a flour portion, as described herein, can include from 95 to 100 percent of the natural amount of endosperm of wheat grain, from 95 to 100 percent of the natural amount of wheat bran of wheat grain, and from 95 to 100 percent of the natural amount of wheat germ of wheat grain. The wheat grain may be from a single source, may be combined from different sources, or may include a single type of wheat grain or two or more different types of wheat grain.

A flour according to the invention can contain reduced amounts of originally-present active enzymes, including a reduced amount of active peroxidase as well as reduced amounts of other enzymes naturally present in a wheat grain. While certain specific embodiments of the invention do not process a flour portion to inactivate enzymes, the concentrations of enzymes contained in a flour portion are less than the concentrations of enzymes contained in a bran portion, so inactivating enzymes of only a bran portion can still result in a large reduction in total amounts of active enzymes within a total amount of milled wheat grain. A flour of the invention can have, for example, a majority of deactivated enzymes compared to the amount of enzymes present in the natural wheat grain constituents of the flour, e.g., compared to the total amount of active enzyme contained in the combined flour portion and bran portion following milling. By processing the bran portion alone (and not the flour portion), the total amount of enzyme of the bran portion can be reduced to a level useful to produce a re-combined flour that contains active enzyme in a desirably reduced amount, e.g., an amount that is less than 50 percent, or less than 80, 90, or 95 percent, of the total amount of active enzyme contained in the original flour and bran portions, such as the amount of enzyme in bran and flour portions following milling and prior to processing the bran portion to deactivate enzymes. In terms of active peroxidase content, certain specific methods of the invention are capable of producing a re-combined flour that contains less than 4000 or 3000 units of active peroxidase per gram, e.g., less than 2000 units active peroxidase per gram, and even less than 1500 units of active peroxidase per gram (on a dry basis). Other enzymes contained in the flour portion are normally also similarly deactivated.

An embodiment of the invention is schematically illustrated in FIG. 1. FIG. 1 shows an example of a milling process according to which constituents of a wheat grain are milled to be separated into a flour portion and a bran portion. According to the illustrated embodiment, the bran portion is divided into three sub-portions: a bran sub-portion, a germ sub-portion, and a shorts sub-portion. At least some of the total bran portion is processed to deactivate enzymes. Referring to the figure, each of the three sub-portions flows through a heat treatment step, indicated by a dotted line. The heat treatment step may involve, for example, contacting the bran portion or sub-portion with steam. The dotted line indicates that at least one, optionally two or more, of the sub-portions are processed to deactivate enzymes (either alone or together as a single stream of material). For example, all three of the sub-portions, meaning the entire bran portion of the milled wheat grain, can be treated as a single stream of material by exposing the entire bran portion at once to steam. Following the heat treatment of one or more of the sub-portions, the streams are shown to be re-combined. (The bran portion need not be separated or re-combined if treated as one portion or stream.) The flour portion is illustrated as not being processed using conditions that would inactivate enzymes. The flour portion and the bran portion are re-combined to produce a flour that contains a reduced amount of active enzymes, while also containing substantially all of the natural constituents of the original milled wheat grain, e.g., a whole-wheat flour.

A flour of the invention can be used to produce any useful type of food product, such as a dough product. Optionally, if desired, other types of flour (e.g., not treated as described herein) may be used in a food or dough composition of the invention, in combination with an amount of the inventive flour. Examples of food products can be food products that contain an amount of the inventive flour and other ingredients to allow labeling of the food product as a "whole-wheat" food product, e.g., a "whole-wheat" dough product or a "whole-wheat" bread product.

Certain specific examples of flours of the invention can include reduced amounts of active enzymes, which results in reduced spoilage of the flour and longer shelf life compared to flours having higher amounts of active enzymes. Also, when a flour of the invention, containing a reduced amount of active enzymes, is included in a food product, the food product can contain a reduced amount of active enzymes, and consequently can also exhibit a longer shelf life compared to food products prepared with other flours having higher amounts of active enzymes.

A dough product of the invention, that includes a flour as described, can be any type of dough product, as will be appreciated. A dough product may be designed to be leavened by the action of yeast or by the action of a chemical leavening system. A dough product may be refrigerator-stable (e.g., refrigerated), freezer-stable (e.g., frozen), or for immediate use upon preparation. A dough product may be sold as a pre-proofed, unproofed, or partially proofed dough, and may include any other dough or food ingredients in combination with flour, as desired.

Examples of types of dough products include yeast or chemically leavened dough products such as developed breads including refrigerated or frozen bread doughs, bread sticks, bagels, baguettes, raised donuts, croissants, etc.; as well as less-developed dough products including refrigerated or frozen biscuits, rolls, cookies, batters, muffins, Danishes, cake donuts; or any other known or developed dough products that includes a flour ingredient.

A dough product of the invention may be prepared and processed according to conventional steps of mixing dough ingredients followed by processing steps that may include any one or more of lapping, folding, cutting, filling, shaping, freezing, resting, proofing, refrigerating or freezing, packaging, etc., in any useful order. A finished dough piece may be packaged according to conventional methods, using conventional materials suitable for a particular type of dough composition. These can include flexible packaging materials such as those used to package non-pressurized refrigerated dough products such as cookies, as well as can or canister-type packages used in pressurized dough products such as refrigerated rolls or biscuits.

A single example of an embodiment of a dough produce according to the invention is a refrigerated, chemically leavened, whole-wheat dough product, such as a bread or biscuit. Such a dough product can be prepared according to methods and using ingredients that are well understood in the dough and baking arts, but with a flour ingredient described herein as an ingredient. In general, such dough compositions can be prepared from ingredients generally known in the dough and bread-making arts, typically including flour, a liquid component such as oil or water, yeast or a chemical leavening system, fat (solid or liquid), and optionally additional ingredients such as salt, sweeteners, dairy products, egg products, processing aids, emulsifiers, particulates, dough conditioners, yeast as a flavorant, flavorings, and the like.

An exemplary chemically leavened dough composition, e.g., in the form of a refrigerated loaf bread product, may contain 40 to 55 weight percent total flour, e.g., from 50 to 55 weight percent (based on the total weight of the dough), with at least 50 percent of the flour being a reduced-enzyme flour as described herein; fat (e.g., an oil) (e.g., up to 5 or 10 percent by weight based on the total weight of the dough composition); water (e.g., from 30 to 35 weight percent water based on the total weight of the dough), and chemical leavening agent. A single, exemplary formulation, is as follows:

| Ingredient | Formula % |
| --- | --- |
| Reduced-Enzyme Whole Wheat Flour | 26.500 |
| Flour, White Bleached Enriched | 24.330 |
| Water | 33.000 |
| Soy Oil | 1.000 |
| Vital Wheat Gluten | 5.000 |
| Glucono-Delta-Lactone (GDL) | 1.360 |
| Encapsulated Sodium Bicarbonate | 1.210 |
| Salt, Medium Fine (Unfilled) | 1.500 |
| Xanthan Gum | 0.100 |
| Dextrose | 3.000 |
| Baker's Special Sugar | 3.000 |
| Total Dough | 100.000 |

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the included claims.

Method of Measuring Peroxidase

Principle:

Peroxidase catalyzes the following reaction:

$$\text{Donor} + H_2O_2 \rightarrow \text{oxidized donor} + H_2O$$

Guaiacol is a suitable donor for colorimetric detection of peroxidase; the oxidized form (tetraguaiacol) is highly colored with an absorbance peak at ~435 nm.

Method:

Peroxidase enzyme is extracted from a sample of wheat material using 0.015-0.020 M ammonium acetate and centrifuged. An aliquot of the supernatant is reacted with alcoholic guaiacol (10% v/v) and 3% hydrogen peroxide. The absorbance at $\lambda$=435 is measured; the increase in absorbance is proportional to the activity of peroxidase. Peroxidase U/g (i.e. "units"/gram) is defined as the increase in absorbance over a 1-hour period (at room temperature, 72-73 F) multiplied by approximately 670 and divided by the sample weight (in grams).

REFERENCES

1. Whitaker, J.; Voragen, A.; Wong, D. Handbook of Food Enzymology, pp. 403-411. 2003, Marcel Dekker, Inc.
2. Bergmeyer, H. U. Methods of Enzymatic Analysis: Enzymes, vol. 2, $2^{nd}$ ed., pp. 685-690. 1985, Wiley-VCH.
3. Vamos-Vigyazo, L. CRC Critical Reviews in Food Science and Nutrition, pp. 84-127. 1981, CRC Press.
4. Varoquaux, P.; Clochard, A.; Sarris, J.; Avisse, C.; Morfeauz, J. N. 1975. Lebensmittel Wissenshaft und Technologie 8:60 (in French).
5. General Mills Inc., Official Method of Analysis—PERO1, 1996.

EXAMPLE

Whole-Wheat Flour—Bran Heating

A general milling method to prepare whole-wheat flour includes first milling the wheat on the conventional mill, which produces streams of a flour portion (i.e., white flour containing mostly endosperm) and a bran portion containing fine bran, coarse bran, and shorts. The fine bran and coarse bran are ground on a hammermill. All streams are then combined to make a whole wheat flour. According to an exemplary method of the invention, we obtained separate amounts of the white flour and bran as prepared in making whole wheat flour as described. The fine bran and coarse bran had been ground on a hammermill. The bran was steamed in the kettle kiln (modified Groen kettle) as follows.

Bran Steaming Procedure

The bran was the combination of ground bran and shorts as used to make whole wheat flour described immediately above. It included all mill streams except the white flour. The relative amounts by weight were 24.9% bran and 75.1% of flour. The Groen kettle had a net capacity of about 4 cubic feet, a steam jacket and has been modified to have steam injection into the product.

1. Turn on kettle kiln jacket steam and set jacket temperature to 350 F.
2. Pour 75 lb of bran into kettle kiln and start agitator.
3. After 5 minutes, turn on injection steam at 212 F (1.5 lbs. steam per minute). Run injection steam for 25 minutes.
4. Continue jacket steam (350 F) for 30 more minutes, then turn off.
5. Run agitator about 20 more minutes, then remove bran from kettle kiln.

| Flour, Bran (Un-steamed and Steamed), and Whole Wheat Flour Data | | | | |
|---|---|---|---|---|
| Description | White flour portion (A) | Ground bran prior to steaming (B) | Steamed bran (C) | Whole wheat flour from blend of A and B | Whole wheat flour from blend of A and C |
| Percent untreated flour | 100 | — | — | 75.10% | 75.27% |
| Percent non-steam-treated bran | — | 100 | — | 24.90% | — |
| Percent steam treated bran | — | 100 | — | — | 24.73% |
| moisture (%) | 13.30% | 11.00% | 10.18% | 11.80% | 12.30% |
| Peroxidase (units/g, 14% mb) | 1746 | 25124 | 153 | 6689 | 1177 |

We claim:

1. A method of processing wheat, the method comprising
   providing milled wheat grain constituents including
      from 70 to 80 weight percent flour portion comprising endosperm, and
      from 20 to 30 weight percent bran portion comprising wheat bran and wheat germ,
   heat treating at least a portion of the bran portion to deactivate enzymes, and
   combining the flour and bran portions to produce flour wherein the flour has substantially the same proportions of natural constituents, other than moisture, as the wheat grain, including:
      from 95 to 100 percent of the natural amount of endosperm of a wheat grain,
      from 95 to 100 percent of the natural amount of wheat bran of a wheat grain,
      from 95 to 100 percent of the natural amount of wheat germ of a wheat grain.

2. The method of claim 1 wherein the milled wheat grain constituents comprise:
   from 70 to 80 weight percent flour portion, and
   from 20 to 30 weight percent bran portion, based on total weight milled wheat grain, and
wherein the bran portion is contacted with steam to deactivate enzymes.

3. The method of claim 2 wherein the bran portion, following heat treatment, contains less than 5000 units active peroxidase per gram.

4. The method of claim 2 wherein the bran portion, following heat treatment, contains less than 1000 units active peroxidase per gram.

5. The method of claim 4 comprising contacting the bran portion with steam at a temperature of about 212 F, in an amount in the range from 0.05 to 0.2 pounds of steam per pound of bran portion.

6. The method of claim 1 wherein the flour portion is not heat-treated.

7. The method of claim 6 comprising combining the non-heat-treated flour portion and the heat-treated bran portion to produce a whole-wheat flour containing less than 3000 units active peroxidase per gram.

8. The method of claim 6 comprising combining the non-heat-treated flour portion and the heat-treated bran portion to produce a whole-wheat flour containing less than 2000 units active peroxidase per gram.

9. The method of claim 6 comprising
   milling wheat grain to produce portions comprising:
      from 70 to 80 weight percent flour portion, and
      from 20 to 30 weight percent bran portion, based on total weight of the milled wheat grain,
   contacting the bran portion with steam to deactivate enzymes contained in the bran portion and produce a bran portion containing less than 1000 units active peroxidase per gram,
   combining the non-heat-treated flour portion and the treated bran portions to produce a whole-wheat flour that has substantially the same proportions of natural constituents, other than moisture, as the wheat grain.

10. A method of milling wheat grain, the method comprising
   providing wheat grain,
   milling the wheat grain to provide milled wheat grain constituents including
      from 70 to 80 weight percent flour portion comprising endosperm, based on total weight milled wheat grain, and
      from 20 to 30 weight percent bran portion comprising wheat bran and wheat germ, based on total weight milled wheat grain,
   heat treating at least a portion of the bran portion to deactivate enzymes, and
   combining the flour portion and the bran portion to produce flour, wherein the flour has substantially the same proportions of natural constituents, other than moisture, as the wheat grain.

11. The method of claim 10 wherein the flour portion is not heat-treated, and the method comprises combining the non-heat-treated flour portion and the treated bran portion to produce a whole-wheat flour that has substantially the same proportions of natural constituents, other than moisture, as the wheat grain.

12. The method of claim 10 wherein heat treating comprises treating at least a portion of the bran portion at a temperature of pressurized steam.

13. The method of claim 12 wherein the temperature is in the range from 250 degrees Fahrenheit to 400 degrees Fahrenheit.

14. The method of claim 12 wherein the heat treating comprises contacting the bran portion with pressurized steam.

15. The method of claim 13 wherein the bran portion, during heat treating, has a moisture content in the range of 10 to 16 weight percent.

* * * * *